(12) United States Patent
Burke (10) Patent No.: US 8,439,351 B1
(45) Date of Patent: May 14, 2013

(54) MEASURING AMOUNT OF MEDIA DURING STACK COMPRESSION

(75) Inventor: Gregory Michael Burke, San Diego, CA (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 13/283,637

(22) Filed: Oct. 28, 2011

(51) Int. Cl.
*B65H 7/08* (2006.01)

(52) U.S. Cl.
USPC .......................................... 271/110; 271/117

(58) Field of Classification Search ................. 271/110, 271/117
See application file for complete search history.

(56) References Cited

U.S. PATENT DOCUMENTS

| | | | |
|---|---|---|---|
| 5,839,015 A | 11/1998 | Faguy et al. | |
| 6,227,534 B1 * | 5/2001 | Schoedinger et al. | 271/114 |
| 7,350,902 B2 | 4/2008 | Dietl et al. | |
| 7,374,163 B2 | 5/2008 | Cook et al. | |
| 7,828,282 B2 | 11/2010 | Zhang | |
| 2010/0019441 A1 * | 1/2010 | Zhang | 271/110 |

* cited by examiner

*Primary Examiner* — Michael McCullough
(74) *Attorney, Agent, or Firm* — Peyton C. Watkins (57) ABSTRACT

A method of determining an amount of media in a stack of media that is disposed within a media holding receptacle of an imaging system, the method includes providing a stack-compressing element configured to contact a first piece of media in the stack of media; providing a sensor to detect a position of the first piece of media; applying a first compressive force to the stack of media via the stack-compressing element in contact with the first piece of media; applying a second compressive force to the stack of media via the stack-compressing element in contact with the first piece of media, the second compressive force being greater than the first compressive force; and using the sensor to detect the position of the first piece of media after the second compressive force is applied to the stack of media.

18 Claims, 12 Drawing Sheets

MEASURING AMOUNT OF MEDIA DURING STACK COMPRESSION

FIELD OF THE INVENTION

The present invention relates generally to the detection of the amount of paper or other media in a stack, and more particularly to the detection of the amount of media in an input tray of a printer or other imaging system.

BACKGROUND OF THE INVENTION

In a printer, a copier or other imaging system, paper or other media is loaded as a stack of cut sheets. For example, blank paper or other recording media is loaded into one or more input trays so that it can be printed. How much media is left in the input tray is not always readily apparent to the user because of the design and location of the input tray. Yet the information of how much media remains is useful for managing the printing operation, as well as for an early warning that more media will be needed to be supplied. As a first example, suppose a user requests a print job requiring 20 sheets of media, but only 10 sheets are in the input tray. If the user leaves the printing job unattended and comes back later, the user will be disappointed to find that the printing job is unfinished because the printer ran out of paper. In addition, while waiting for the job to continue, the printhead may return to the maintenance station and expel additional ink that would not have occurred otherwise. As a second example, if a user has a job that needs to be printed, but does not realize the printer is almost out of paper, the user may need to make a special trip to obtain more paper, thus causing delays in printing the job. In this example, an early warning would be helpful so that the user can obtain more paper before his local supply runs out.

Media stack height detectors have been disclosed in the prior art, for example U.S. Pat. No. 5,839,015 and U.S. Pat. No. 7,374,163. However, competitive pressures make it desirable to incorporate the function of media stack height detection at low cost. (The term "stack height" is used generically herein to refer to an amount of media in a stack of media and does not necessarily imply a vertical measurement.) Prior art media stack height detectors typically use an extra coupling component that contacts the top sheet of the media stack at one end and has a portion that provides a stack-height-dependent signal via a corresponding sensor at another other end. The extra coupling component not only adds cost to the system, but also its contacting the sheet of media adds drag as the sheet is moved from the media input tray into a position for printing. U.S. Pat. No. 7,828,282, the disclosure of which is herein incorporated by reference, addresses this problem by affixing a member having a height-dependent property to the pick arm assembly that houses the pick roller. Since the pick roller contacts the first sheet in the stack, a sensor that measures the height-dependent property is able to determine the position of the first sheet in the stack.

It has been found that, under certain circumstances, the accuracy of media stack height detectors can be limited to about plus or minus five sheets of media. Although this is sufficiently accurate for providing an early warning to the user that the media holding receptacle is approaching empty, a more accurate indication is preferable for the function of notifying the user whether there is enough media to complete a particular print job. It is also sometimes found that the accuracy of stack height detection becomes even worse as the media holding receptacle becomes closer to empty. Thus, at the times when improved accuracy is needed, the accuracy actually becomes worse. Furthermore, if media in the media holding receptacle has already been printed on, it can become less flat, resulting in even worse accuracy in the measurement of the amount of media in the stack.

What is needed is a method of measuring the amount of media in a stack of media having improved accuracy, and an accuracy that does not degrade as the media holding receptacle approaches empty.

SUMMARY OF THE INVENTION

The present invention is directed to overcoming one or more of the problems set forth above. Briefly summarized, according to one aspect of the invention, the invention resides in a method of determining an amount of media in a stack of media that is disposed within a media holding receptacle of an imaging system, the method comprising: providing a stack-compressing element configured to contact a first piece of media in the stack of media, the first piece of media being more remote from a holding surface of the media holding receptacle than other pieces of media in the stack of media; providing a sensor to detect a position of the first piece of media; applying a first compressive force to the stack of media via the stack-compressing element in contact with the first piece of media; applying a second compressive force to the stack of media via the stack-compressing element in contact with the first piece of media, the second compressive force being greater than the first compressive force; and using the sensor to detect the position of the first piece of media after the second compressive force is applied to the stack of media.

DETAILED DESCRIPTION OF THE INVENTION

Although the examples described herein refer to inkjet carriage printer systems, other types of imaging systems can also benefit from the advantages of low-cost media stack height detection as provided by the present invention. Such printing systems can include a variety of inkjet printing systems, other types of printing or copying technologies such as dye sublimation systems or electrophotographic systems, or in general, monitoring the height of a stack of media in an imaging system even if the intended usage of the media is for scanning rather than for printing.

Figure 1:
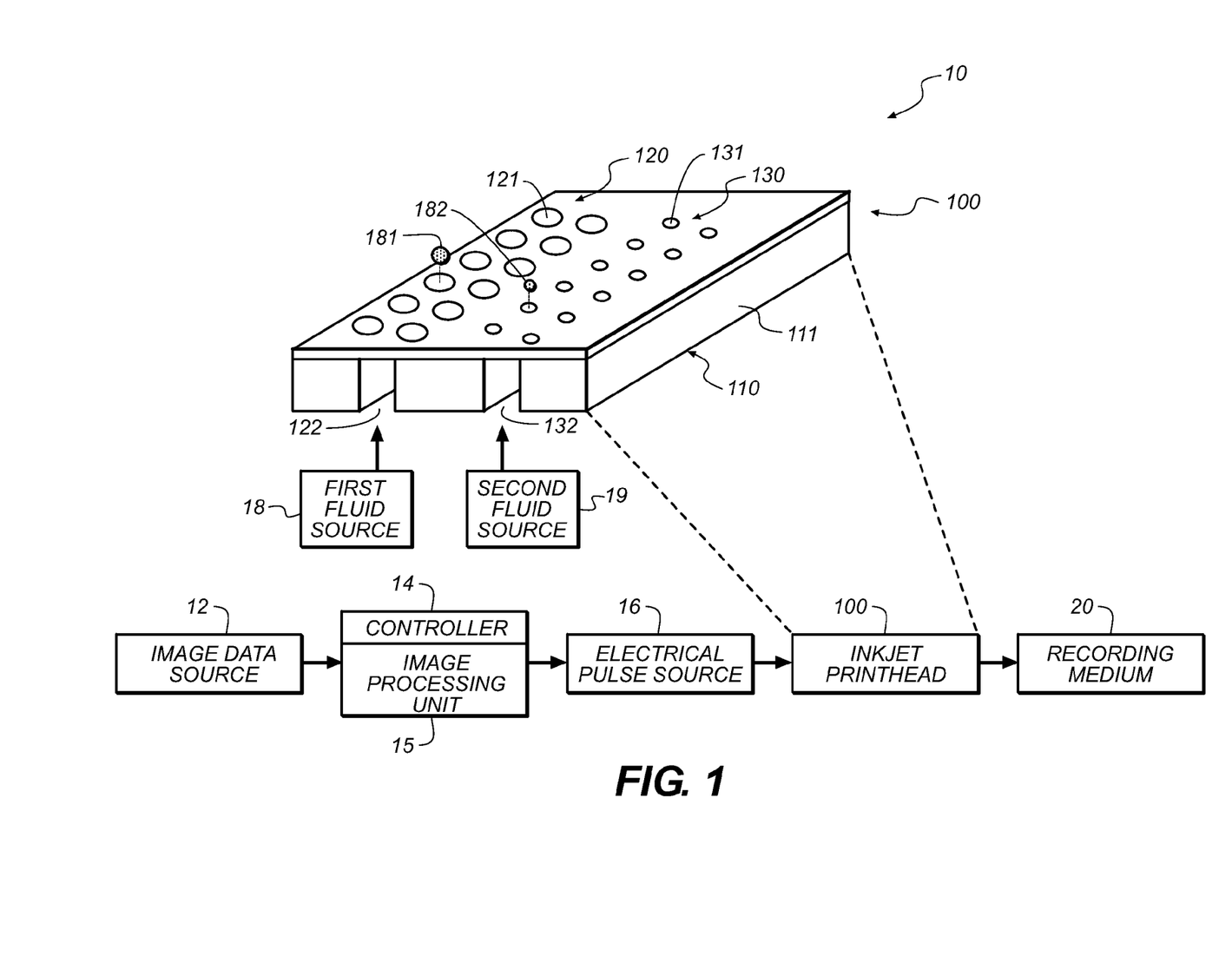
FIG. 1 is a schematic representation of an inkjet printer system.

Referring to FIG. 1, a schematic representation of an inkjet printer system 10 is shown, as described in U.S. Pat. No. 7,350,902, and incorporated by reference herein in its entirety. Printer system 10 includes a source 12 of image data, which provides data signals that are interpreted by a controller 14 as commands to eject drops. Controller 14 includes an image processing unit 15 for rendering images for printing, and outputs signals to a source 16 of electrical energy pulses that are inputted to an inkjet printhead 100, which includes at least one printhead die 110. In the example shown in FIG. 1, there are two nozzle arrays 120, 130 for inkjet printhead 100. Nozzles 121 in the first nozzle array 120 have a larger opening area than nozzles 131 in the second nozzle array 130. In this example, each of the two nozzle arrays 120, 130 has two staggered rows of nozzles 121, 131, each row having a nozzle density of 600 per inch. The effective nozzle density then in each array 120, 130 is 1200 per inch. If pixels on the recording medium were sequentially numbered along the paper advance direction, the nozzles from one row of an array would print the odd numbered pixels, while the nozzles from the other row of the array would print the even numbered pixels. In fluid communication with each nozzle array 120, 130 is a corresponding ink delivery pathway. Ink delivery pathway 122 is in fluid communication with nozzle array 120, and ink delivery pathway 132 is in fluid communication with nozzle array 130. Portions of fluid delivery pathways 122 and 132 are shown in FIG. 1, as openings through printhead die substrate 111. One or more printhead die 110 can be included in inkjet printhead 100, but only one printhead die 110 is exemplarily shown in FIG. 1 for simplistic illustrative purposes. The printhead die 110 is arranged on a support member as discussed below relative to FIG. 2. In FIG. 1, a first ink source 18 supplies ink to first nozzle array 120 via ink delivery pathway 122, and a second ink source 19 supplies ink to second nozzle array 130 via ink delivery pathway 132. Although distinct ink sources 18 and 19 are shown, in some applications it is beneficial to have a single ink source supplying ink to both nozzle arrays 120 and 130 via ink delivery pathways 122 and 132 respectively. Also, in some embodiments, fewer than two nozzle arrays are included on printhead die 110; in other embodiments more than two nozzle arrays are used. In some embodiments, all nozzles on a printhead die 110 can be the same size, rather than having multiple sized nozzles on a printhead die.

Not shown in FIG. 1 are the drop forming mechanisms associated with the nozzles 121, 131. Drop forming mechanisms can be of a variety of types, some of which include a heating element to vaporize a portion of ink and thereby cause ejection of a droplet, or a piezoelectric transducer to constrict the volume of a fluid chamber and thereby cause ejection, or an actuator which is made to move (for example, by heating a bilayer element) and thereby cause ejection. In any case, electrical pulses from pulse source 16 are sent to the various drop ejectors according to the desired deposition pattern. In the example of FIG. 1, droplets 181 ejected from nozzle array 120 are larger than droplets 182 ejected from nozzle array 130, due to the larger nozzle opening area. Typically other aspects of the drop forming mechanisms (not shown) associated respectively with nozzle arrays 120 and 130 are also sized differently in order to optimize the drop ejection process for the different sized drops. During operation, droplets of ink are deposited on a recording media 20.

Figure 2:
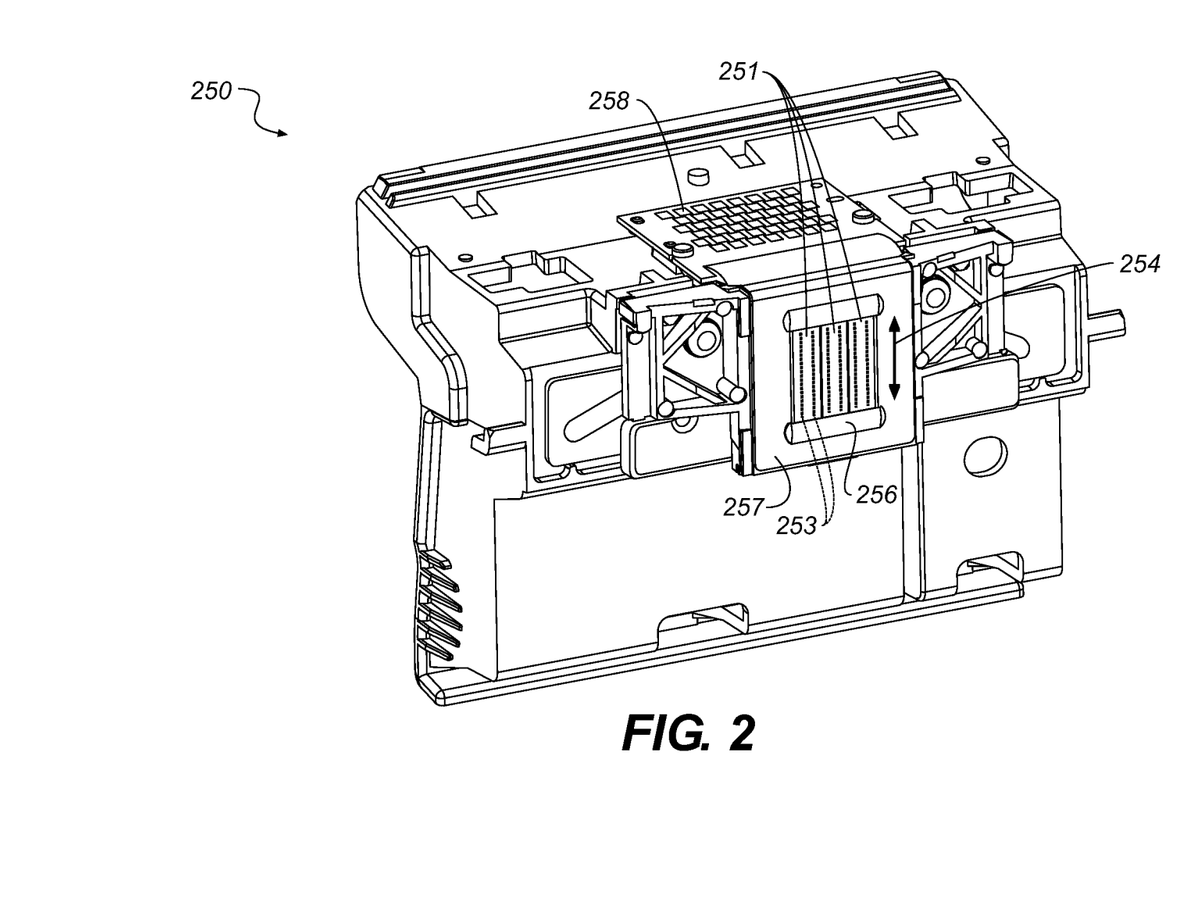
FIG. 2 is a perspective of a portion of a printhead chassis.

FIG. 2 shows a perspective of a portion of a printhead chassis 250, which is an example of an inkjet printhead 100. Printhead chassis 250 includes three printhead die 251 (similar to printhead die 110), each printhead die containing two nozzle arrays 253, so that printhead chassis 250 contains six nozzle arrays 253 altogether. The six nozzle arrays 253 in this example are each connected to separate ink sources (not shown in FIG. 2), such as cyan, magenta, yellow, text black, photo black, and a colorless protective printing fluid. Each of the six nozzle arrays 253 is disposed along direction 254, and the length of each nozzle array 253 along direction 254 is typically on the order of 1 inch or less. Typical lengths of recording media 20 are 6 inches for photographic prints (4 inches by 6 inches), or 11 inches for 8.5 by 11 inch paper. Thus, in order to print the full image, a number of swaths are successively printed while moving printhead chassis 250 across the recording media 20. Following the printing of a swath, the recording media 20 is advanced.

Also shown in FIG. 2 is a flex circuit 257 to which the printhead die 251 are electrically interconnected, for example by wire bonding or TAB bonding. The interconnections are covered by an encapsulant 256 to protect them. Flex circuit 257 bends around the side of printhead chassis 250 and connects to connector board 258. When printhead chassis 250 is mounted into the carriage 200 (see FIG. 3), connector board 258 is electrically connected to a connector (not shown) on the carriage 200, so that electrical signals are transmitted to the printhead die 251.

Figure 3:
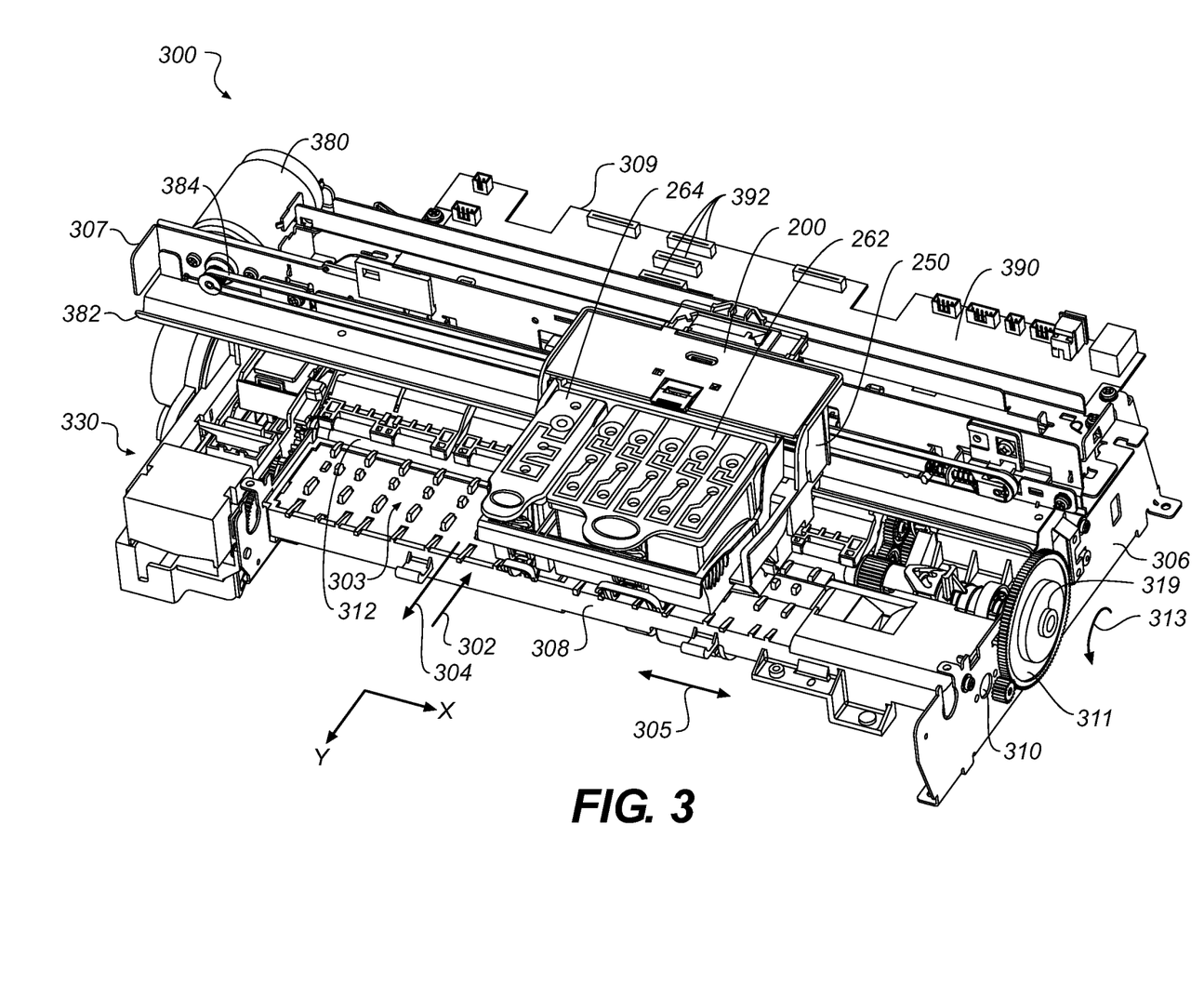
FIG. 3 is a perspective of a portion of a carriage printer.

FIG. 3 shows a portion of a carriage printer. Some of the parts of the printer have been hidden in the view shown in FIG. 3 so that other parts are more clearly seen. Printer chassis 300 has a print region 303 across which carriage 200 is moved back and forth in direction 305 along the X axis, between the right side 306 and the left side 307 of printer chassis 300, while drops are ejected from printhead die 251 on printhead chassis 250 that is mounted on carriage 200. Carriage motor 380 moves belt 384 to move carriage 200 along carriage guide rail 382. Printhead chassis 250 is mounted in carriage 200, and ink supplies 262 and 264 are mounted in the printhead chassis 250. The mounting orientation of printhead chassis 250 is rotated relative to the view in FIG. 2, so that the printhead die 251 (shown in FIG. 2) are located at the bottom side of printhead chassis 250, the droplets of ink ejected downward onto the recording media 20 in print region 303 in the view of FIG. 3. Ink supply 262, in this example, contains five ink sources cyan, magenta, yellow, photo black, and colorless protective fluid, while ink supply 264 contains the ink source for text black. Paper, or other recording media 20 (sometimes generically referred to as paper herein), is loaded, in this example, along paper load entry direction 302 at the front portion 308 of printer chassis 300.

Figure 4:
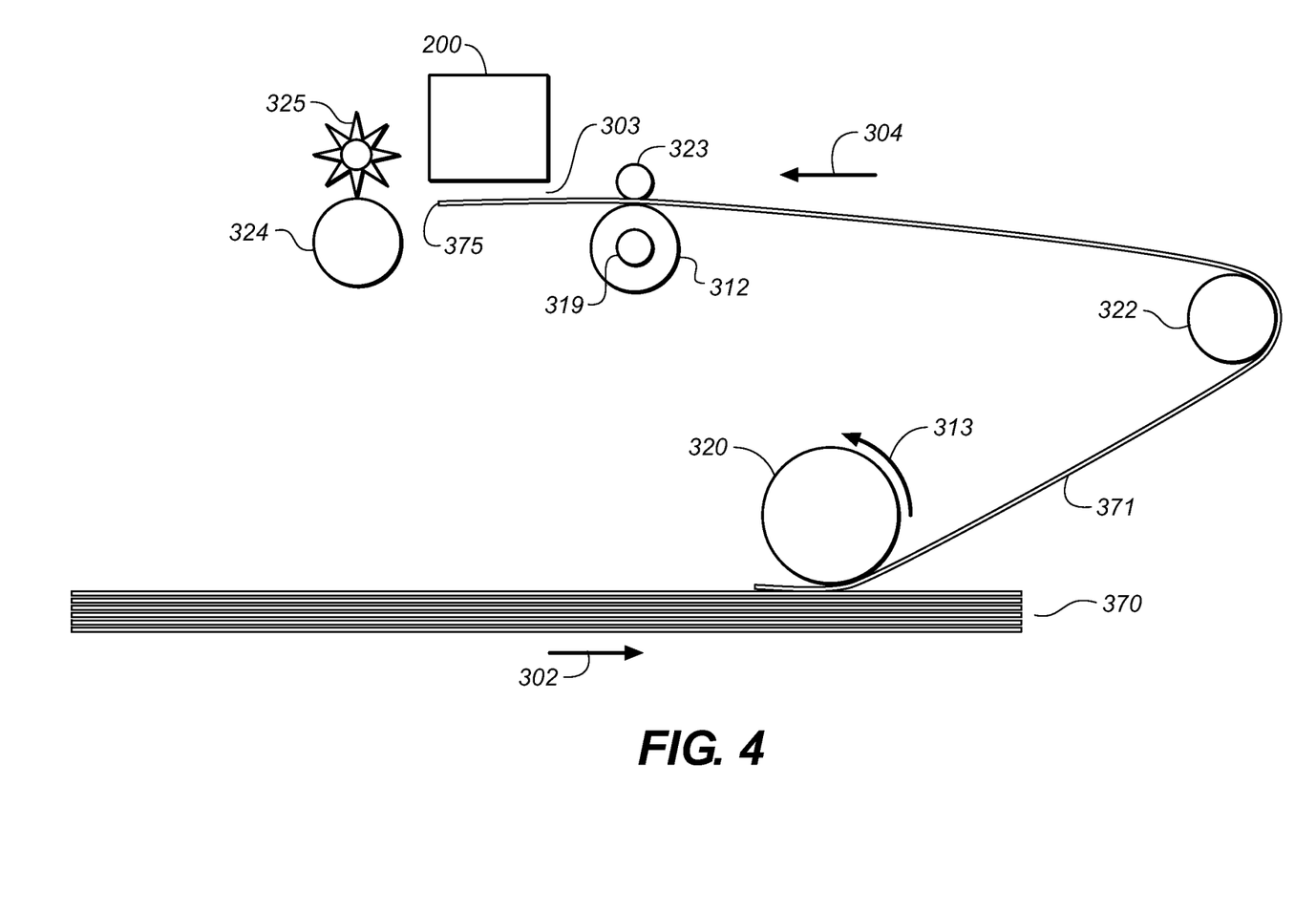
FIG. 4 is a schematic side view of a paper path in a carriage printer.

A variety of rollers are used to advance the recording media 20 through the printer, as shown schematically in the side view of FIG. 4. In this example, a pick roller 320 moves the top sheet 371 of a stack 370 of paper or other recording media 20 in the direction of arrow 302. A media separator (not shown) separates the top sheet 371 from adjacent sheets so that only the top sheet 371 is advanced. A turn roller 322, toward the rear portion 309 of the printer chassis 300 shown in FIG. 3, acts to move the paper around a C-shaped path (in cooperation with a curved rear wall surface) so that the paper continues to advance along paper exit direction arrow 304 from the rear direction 309 of the printer shown in FIG. 3. The paper is then moved by feed roller 312 and idler roller(s) 323 to advance along the Y axis in FIG. 3) and across print region 303, and from there to a discharge roller 324 and star wheel(s) 325 so that a paper, printed with an image, exits along direction 304 (see FIG. 3). In FIG. 4, the leading edge 375 of top sheet 371 is advancing through print region 303 (see FIG. 3). Feed roller 312 includes a feed roller shaft 319 along its axis, and feed roller gear 311 (see FIG. 3) is mounted on the feed roller shaft 319. Feed roller 312 can include a separate roller mounted on feed roller shaft 319, or a thin high friction coating on feed roller shaft 319. The motor that powers the paper advance rollers is not shown in FIG. 3, but the hole 310 at the right side 306 of the printer chassis 300 (shown in FIG. 3) is where the motor gear (not shown) protrudes through in order to engage feed roller gear 311, as well as the gear for the discharge roller (not shown). For normal paper pick-up and feeding, it is desired that all rollers rotate in forward direction 313.

Referring to FIG. 3, toward the left side 307 in the example printer chassis 300 is the maintenance station 330. Toward the rear portion 309 of the printer in printer chassis 300 is located electronics board 390, which includes cable connectors 392 for communicating via cables (not shown) to the printhead carriage 200 and from there to the printhead chassis 250. Also mounted on the electronics board 390 are motor controllers for the carriage motor 380 and for the paper advance motor, a processor or other control electronics (shown schematically as 14 and 15 in FIG. 1) for controlling the printing process, including image processing, and an optional connector for a cable to a host computer.

Figure 5:
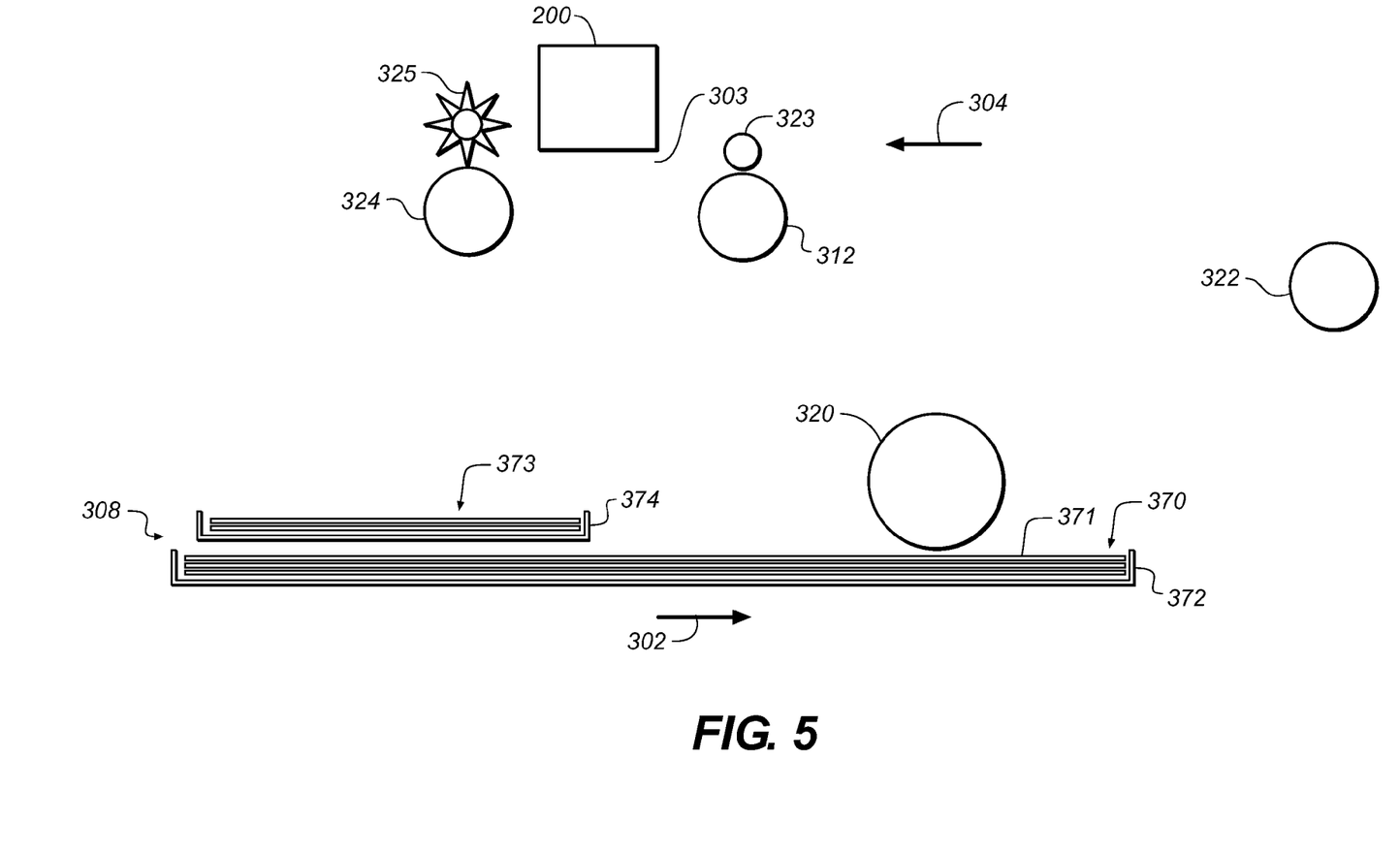
FIG. 5 is a schematic side view of a paper path in a carriage printer, including a main media tray, and a photo media tray located in a standby position.
Figure 6:
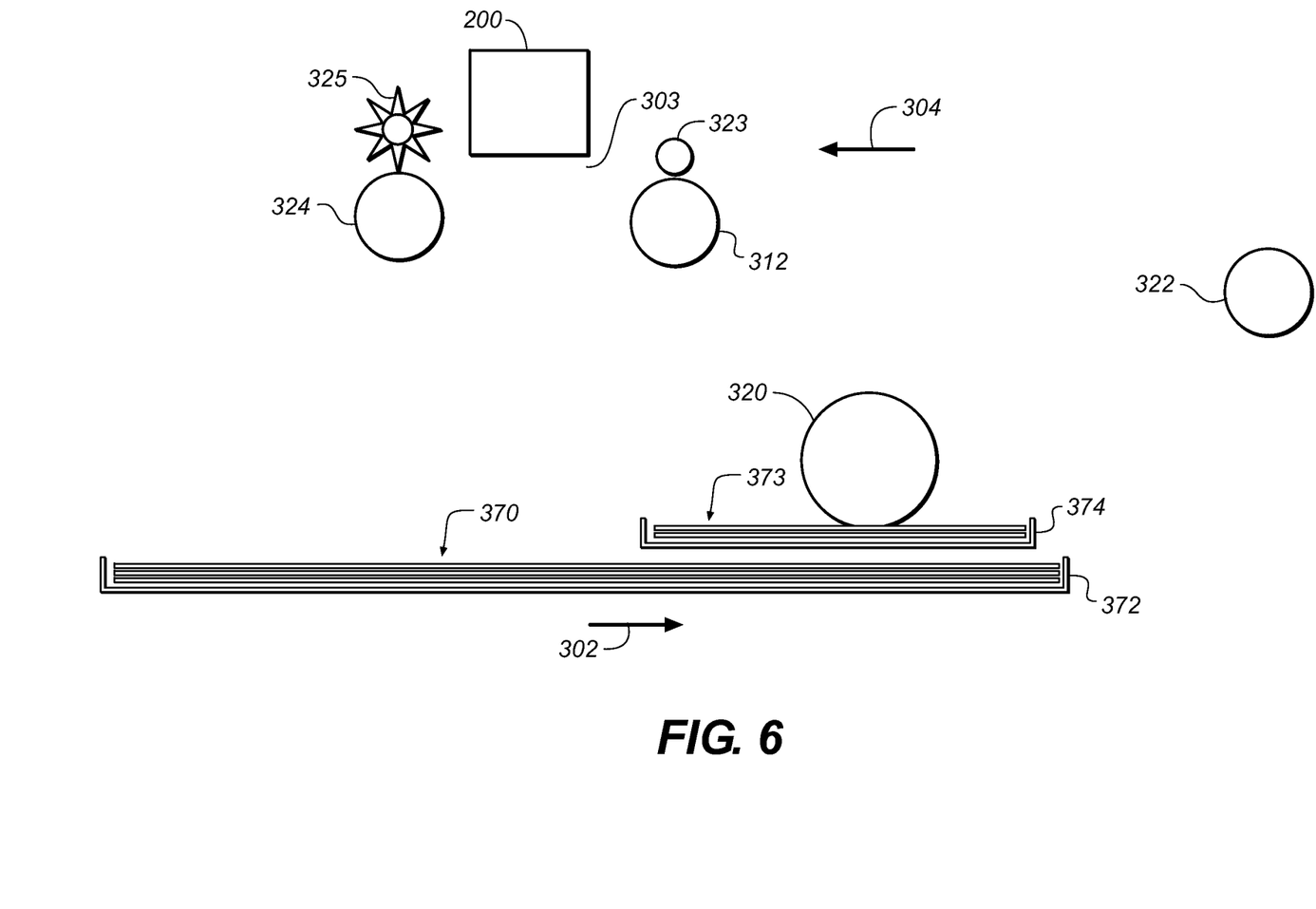
FIG. 6 is a schematic side view of a paper path in a carriage printer, including a main media tray, and a photo media tray located in a printing position.

Referring to FIGS. 5 and 6, in some carriage printers there is both a main media input tray for a standard sized sheet of paper, as well as a smaller media input tray for holding photo media prior to printing. In both figures there is a paper stack 370 in main paper tray 372 and there is a stack of photo media 373 in photo media tray 374. Main paper tray 372 and photo media tray 374 are examples of media holding receptacles. In this example, the main paper tray 372 is able to hold sheets of recording media 20 up to a highest stack level. The bottom of photo media tray 374 is configured to be spaced apart from the top sheet 371 of media in the main paper tray 372 when the main paper tray 372 is full, so that that photo paper tray 374 can move freely, even when the main paper tray 372 is full. The sheets in paper stack 370 are of a larger size (for example, 8.5"×11") compared to the sheets in paper stack 373 (for example, 4"×6"), and photo media tray 374 is not as long as main paper tray 372. In the example shown schematically in FIG. 5, the photo media tray 374 is in a standby position near the front portion 308 of the printer. With the photo media tray 374 in this position, a pick roller 320 is able to contact the top sheet in paper stack 370 in the main paper tray 372. Additional photo media 373 can be loaded, while photo media tray 374 is in standby position near the front portion 308 of the printer. In FIG. 6, the photo tray 374 has been moved along direction of arrow 302 to its printing position. When the photo media tray 374 is in the printing position, the pick roller 320 is able to contact the top sheet in photo media stack 373. A first signal can be sent to the printer controller when the photo media tray 374 is in the standby position so that the printer controller knows that the pick roller 320 is in contact with media in the main paper tray 372. A second signal can be sent to the printer controller when the photo media tray 374 is in the printing position so that the printer controller knows that the pick roller 320 is in contact with recording media 20 in the photo paper tray 374.

Figure 7:
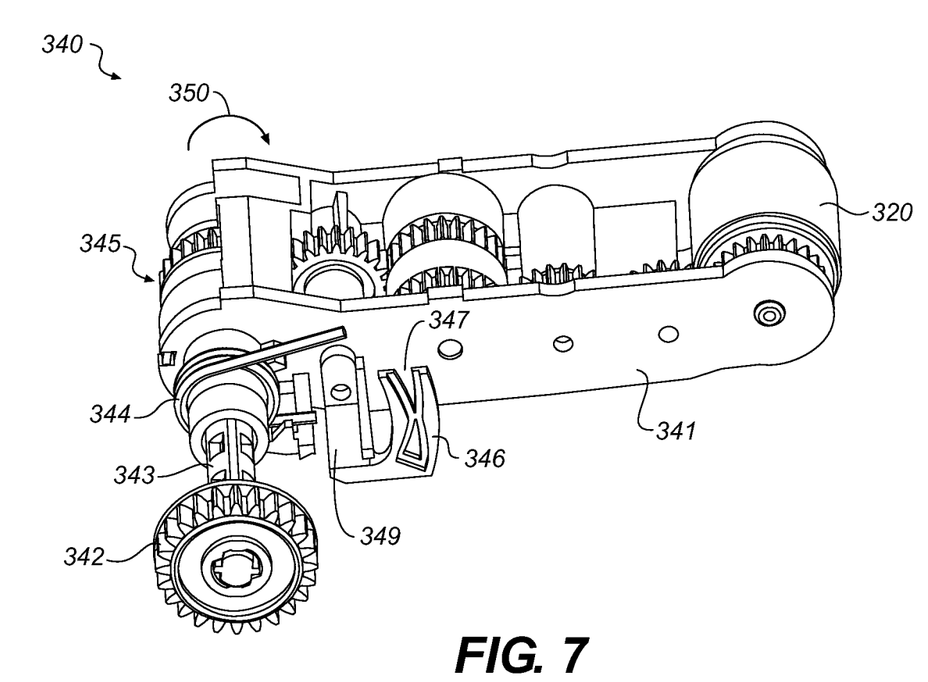
FIG. 7 is a perspective of a pick arm assembly.

In some printing systems, the pick roller 320 is mounted on a pivotable pick arm, which is able to be moved up or down to rest on the top sheet of media, whichever media tray is beneath it. FIG. 7 shows a pivotable pick arm assembly 340. In the embodiment show, pick roller 320 is rotationally mounted near an end of pick arm frame 341. Near the other end of pick arm frame 341, drive gear 342 is mounted on axle 343, whose axis is coincident with the pivot axis of pick arm assembly 340. Drive gear 342 receives power from the paper advance motor (not shown), and transmits the power through axle 343 and gear train 345 to pick roller 320. Optionally, a torsion spring 344 provides a torque to cause the pick arm assembly 340 to rotate about its pivot axis in direction 350, so that the surface of the pick roller 320 is urged into contact with the top sheet 371 of media. For printers where the pick arm assembly 340 does not include a torsion spring 344, the weight of the pick arm assembly 340 urges pick roller 320 into contact with the top sheet 371 of media (see FIGS. 5 and 10)

Attached to the pivotable pick arm assembly 340 shown in FIG. 7 is an optical block 346 including at least one window 347. The optical block 346 and its associated window 347 are mounted onto and spaced apart from pick arm frame 341 by bracket 349. Optionally, bracket 349 can be formed integrally with optical block 346 and its window, for example by injection molding. As pick arm assembly 340 rotates about its pivot axis until the pick roller 320 is positioned to contact an individual sheet in a paper stack 370—for example, the top sheet 371 in main paper tray 372 (FIG. 5) or the top sheet in photo media tray 374 (depending on whether photo media tray 374 is in its standby position or its printing position respectively), optical block 346 and its associated window 347 will pivot together with the pick arm assembly 340. Thus as pick roller 320 is raised or lowered to contact the top sheet 371 of media, optical block 346 and its associated window 347 are also raised or lowered. In other words, optical block 346 is a member that is movable by pick arm assembly 340

Figure 8:
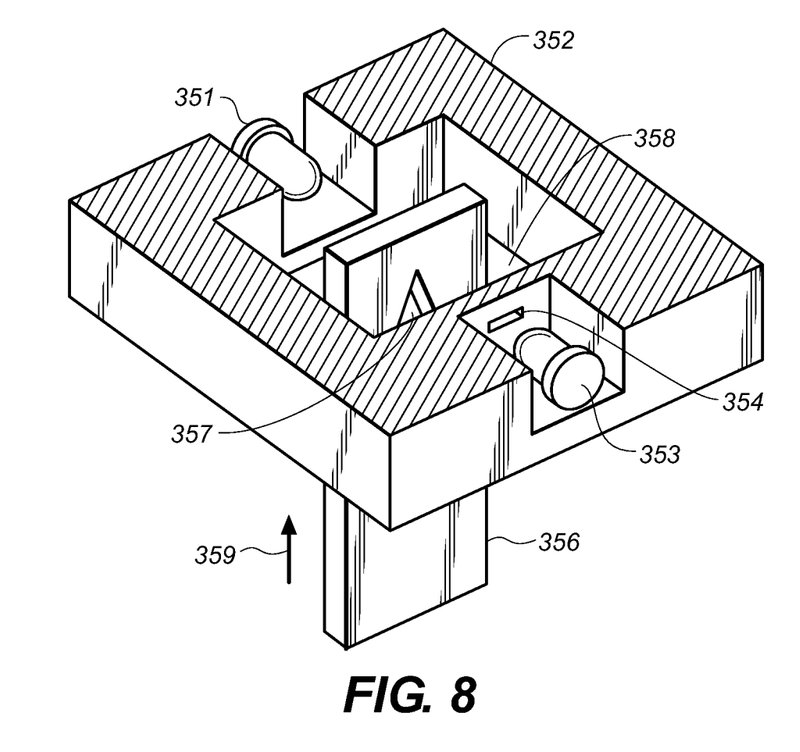
FIG. 8 is a cutaway view of a sensor housing surrounding an optical block having a window with a varying width.

The position of the optical block 346, and therefore the position of the pick roller 320 and the corresponding position of the individual sheet of recording media 20 contacted by pick roller 320, can be detected by the amount of light received by an optical sensor 351, as illustrated schematically in the cutaway view of FIG. 8. Optical sensor 351, in this example, is a photosensor that is mounted in sensor housing 352, which also houses light emitter 353 (typically an LED). Sensor housing 352 is stationarily mounted on printer chassis 300 (see FIG. 3), and is configured to have an open region 358 in the optical path between optical sensor 351 and light emitter 353, so that optical sensor 351 is spaced apart from light emitter 353. Optical block 356 and associated window 357 move up and down along direction 359 within open region 358. (Direction 359 is shown as a straight line in FIG. 8, but it can alternatively be an arc, as shown by pivoting direction 350 with regard to pivoting optical block 346 of FIG. 7.) Window 357 permits a different amount of light from light emitter 353 by optical sensor 351, depending upon the position of optical block 356. In the example of FIG. 8, this is because window 357 is a tapered opening in optical block 356. In other words, the width of window opening 357 varies, with the variation substantially along the length of the optical block 356 which is along direction 359.

Although sensor housing 352 has been cut away in FIG. 8, in order to show optical sensor 351 and light emitter 353, in actuality optical sensor 351 is shielded so that it predominantly can receive light only from light emitter 353. In addition, a slit aperture 354 can be positioned to be between light emitter 353 and optical block 356 in order to increase the resolution and reduces signal noise from optical sensor 351 corresponding to the position of optical block 356 and associated tapered window opening 357. Slit aperture 354 has a narrow dimension that is substantially parallel to direction 359, and a longer dimension that is substantially perpendicular to direction 359. The narrow dimension of slit aperture 354 is typically within a range of 0.1 mm to 3.0 mm. The longer dimension is typically roughly parallel with the plane of the top sheet 371 of paper (i.e. roughly parallel to the bottom of the media tray when the media holder is a tray). However, in order to provide the best signal for the case where the optical block 356 moves in a pivoting arc, it can be advantageous for the long dimension L of slit aperture 354 to be slightly nonparallel to the bottom of the media tray.

Figure 9:
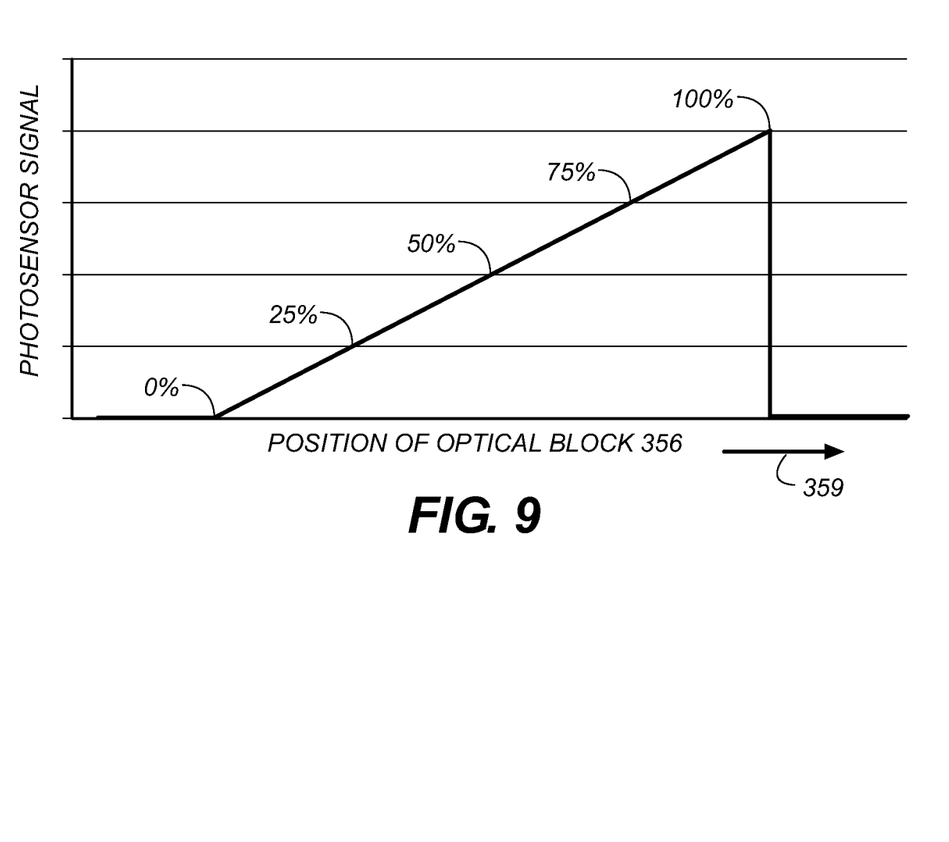
FIG. 9 is a representation of the variation in the photosensor signal as a function of the position of the optical block for the case of a window width that varies linearly.

The signal from optical sensor 351 is sent to the printer controller electronics. The photosensor signal increases as more light is received by optical sensor 351. In the schematic shown in FIG. 8, as optical block 356 moves upward (corresponding to a higher position of the pick roller 320 in FIG. 7, i.e. a higher media stack height), less light is blocked by tapered window opening 357 and the photosensor signal increases accordingly. This is shown schematically in FIG. 9 for the case of a window 357 where the tapering is linear, i.e. in this example the width of the window 357 varies linearly along optical block 356. The pick roller height, and therefore the height of the top sheet 371 of media in the tray can thus be monitored via the photosensor signal. For example, if the photosensor signal is at the levels indicated as 25%, it indicates that the media stack height is 25% of its maximum (i.e. 25% of the recording media is left). Of course, the percentages shown in FIG. 9 are just examples. The photosensor signal varies in a continuous fashion so that stack height levels anywhere between 0% and 100% can be indicated. Optionally, the photosensor signal can be calibrated by measuring the signal at the 100% point (just before the drop-off) and adjusting the energy provided to the light source until the photosensor signal reaches the proper magnitude.

In the example described above relative to FIG. 8, the optical block 356 moves with the pick arm assembly 340 and the sensor housing 352 is kept stationary. Other alternatives include mounting the sensor housing 352 on the pick arm assembly 340 and keeping the optical block 356 stationary.

Figure 10:
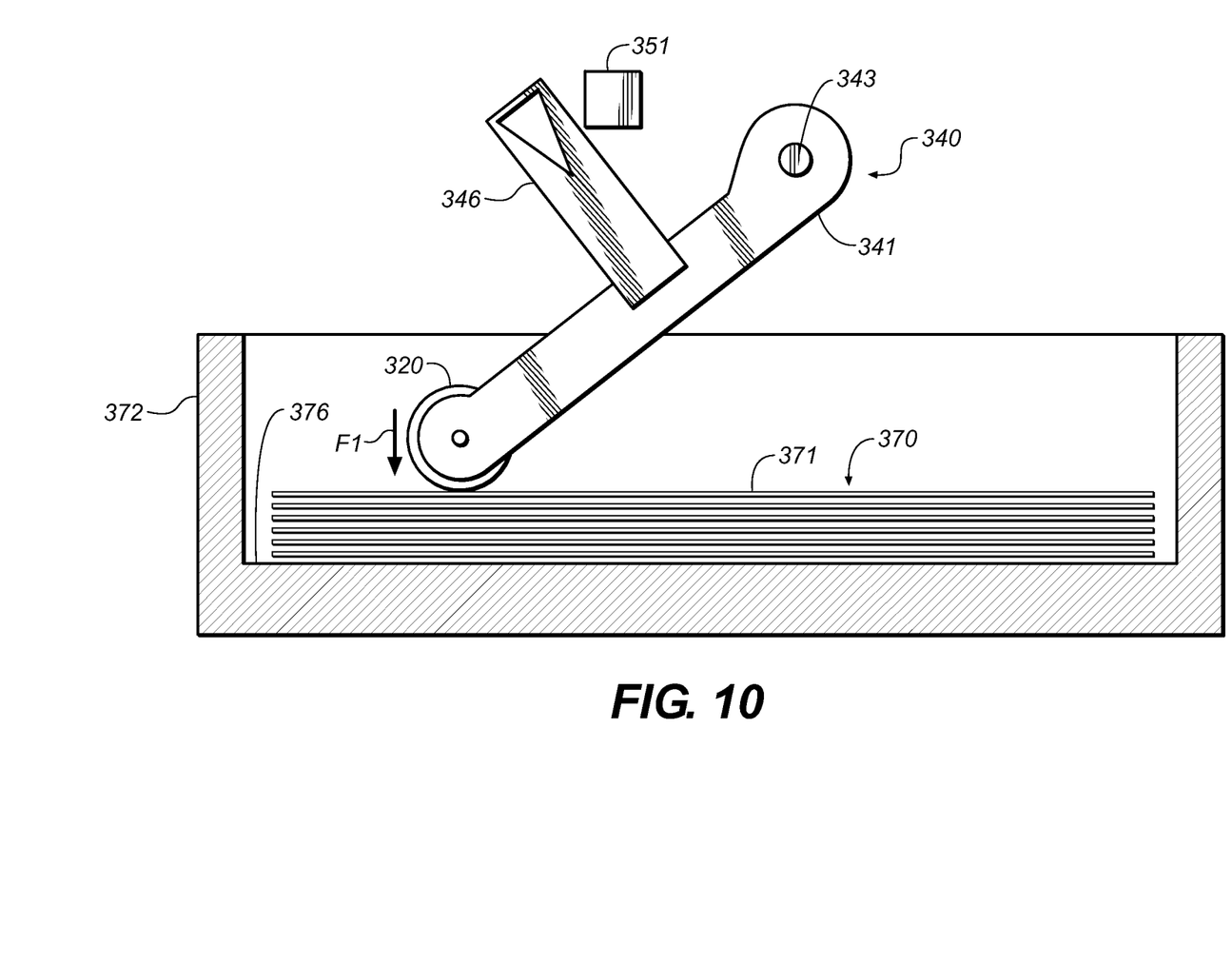
FIG. 10 is a schematic side view of the pick arm assembly and optical block where a first compressive force F1 is applied.

FIG. 10 shows a schematic side view of a stack of media 370 in a media holding receptacle (main paper tray 372). Pick arm assembly 340 is pivotably mounted on axle 343 and includes a pick roller 320 that is rotationally mounted near an end of pick arm frame 341. Pick roller 320 is urged into contact with top sheet 371 of stack 370 by a force F1 that is transmitted to the stack of media 370. Top sheet 371 is more remote from a holding surface 376 of main paper tray 372 than other pieces of media in stack 370 are, so that pick arm assembly 340 acts as a stack-compressing element. Force F1 is a first compressive force that is applied to the stack of media 370 by the stack compressing element in contact with the top sheet 371. Optical sensor 351 detects a position of pick roller 320, and thereby a position of the top sheet 371 with reference to optical block 346 as described above. First compressive force F1 can include force due to the weight of the pick arm assembly 340 or the force from a torsion spring 344 as described above relative to FIG. 7. In some instances, first compressive force F1 is not sufficient to compress stack of media 370 to enable a measurement of the amount of media that is accurate to better than plus or minus several sheets.

There can be a variety of reasons why a stack of media 370 is not sufficiently compressed by first compressive force F1 in order to enable an accurate measurement. Some papers have special coatings on one side and the asymmetric layers can cause a bow in the sheets of media. The amount of bow can depend upon environmental factors such as humidity. Papers that have previously been printed on can have cockle or curl that causes the sheets to deviate from flatness. Advancing a previous sheet of media past the paper separator (discussed above relative to FIG. 4) can introduce additional spacing between the top few sheets remaining in the stack of media 370. Also, when the stack of media 370 is nearly depleted, the weight of the stack of media 370 is not sufficient to compress the stack under its own weight. Nonuniformity in first compressive force F1 can also provide variability in the amount of compression. Because first compressive force F1 is not adequate to sufficiently compress stack of media 370 in such cases, there can be variability in the position of top sheet 371 when first compressive force F1 alone is applied in some cases, resulting in an inaccurate measurement of stack height.

Figure 11:
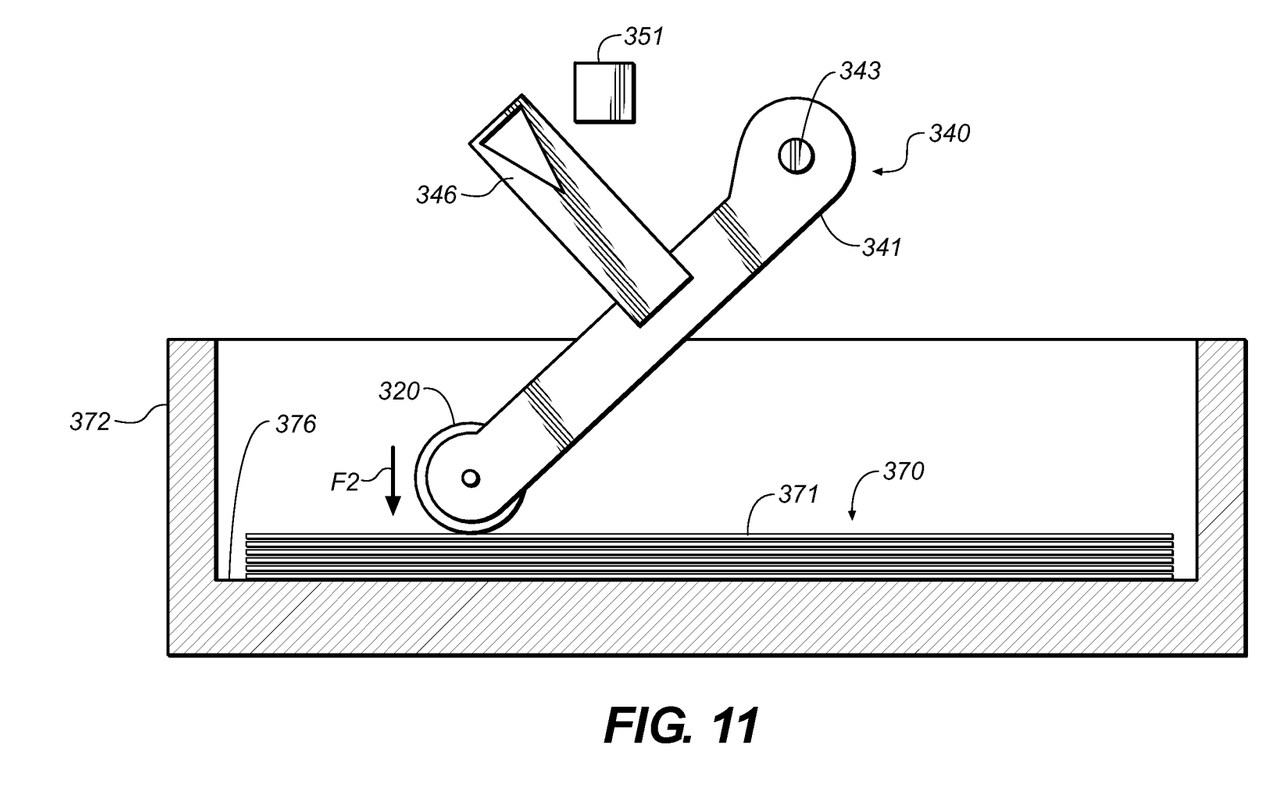
FIG. 11 is a schematic side view similar to FIG. 10 after a compressive force F2 has been applied, where F2 is greater than F1.

FIG. 11 is similar to FIG. 10, but after a second compressive force F2 has been applied to the stack of media 370 via the stack-compressing element (pick arm assembly 340) in contact with the top sheet 371. Second compressive force F2 is greater than first compressive force F1. Second compressive force F2 can include first compressive force F1 plus an additional force that further compresses the stack of media 370. For example, with reference to FIG. 7, when drive gear 342 receives power from the paper advance motor (not shown), and transmits the power through axle 343 and gear train 345 to pick roller 320, not only is pick roller 320 caused to rotate for moving top sheet 371 away from main paper tray 372 and toward turn roller 322 (FIG. 4), but also a downward torque is generated about axle 343. This downward torque causes the arm of pick arm frame 341 to pivot in a direction that moves pick roller 320 toward holding surface 376 (FIG. 11) of the media holding receptacle (main paper tray 372 in this example). In this example, second compressive force F2 includes first compressive force F1 plus the force due to torque from the motor driving the gear train 345 of pick arm assembly 340. F2 is represented by an arrow in FIG. 11 that is bolder than the arrow representing F1 in FIG. 10. As a result (comparing FIGS. 10 and 11) the stack of media 370 is more fully compressed with the application of second compressive force F2. Mechanical linkages in gear train 345 (see FIG. 7) are also more rigidly coupled when power is transferred through gear train 345, further reducing variability in the position of pick roller 320, and thereby reducing variability in the position of optical block 346. Even if stack of media 370 is nearly depleted, second compressive force F2 is sufficient to provide a more repeatable position of top sheet 371.

According to embodiments of the invention, optical sensor 351 is used to detect the position of the top sheet 371 after the second compressive force F2 is applied to the stack of media 370. In the example discussed above relative to FIGS. 7, 10 and 11, when controller 14 (FIG. 1) directs power to be applied to drive gear 342, the controller 14 can also direct optical sensor 351 to send back a sequential plurality of signals to controller 14, in order to indicate position of optical block 346 as a function of time. The plurality of signals are interpreted by controller 14 as a corresponding plurality of distances between the top sheet 371 and the holding surface 376 of the main paper tray 372. One of the plurality of signals is selected as corresponding to a smallest distance between top sheet 371 and holding surface 376. A value corresponding to the selected signal is then stored as a current stack height value. A thickness of a piece of media in stack of media 370 is then provided. This can be done as an actual dimensional thickness (for example, 0.1 mm) or it can be done in terms of identifying the sheet of media as a particular type of media having a known thickness. The type of media can be identified, for example, by the user indicating the type of media, or by the printer reading a manufacturer's identification mark on a sheet of media. The provided thickness can be used together with the current stack height to determine a number of pieces of media currently in the stack of media 370. For the case where the thickness of the sheet of media is provided as an actual dimensional thickness and the current stack height is also provided as a dimension, the current stack height can simply be divided by the actual dimensional thickness to obtain the number of sheets. For cases where the type of media is identified using a manufacturer's mark, a look-up table in the printer can be used to obtain the number of pieces of media as a function of the current stack height value. Further improvement in the accuracy of the measurement can be obtained by performing a calibration when the media holding receptacle (main paper tray 372) is empty. In other words, the height of the holding surface 376 is measured after application of second compressive force F2 to provide a more accurate reference height.

In the example described above relative to FIGS. 7, 10 and 11, the second compressive force F2 is applied when power is transmitted to drive gear 342 to rotate pick roller 320. Optical sensor 351 is used to detect the position of the top sheet 371 during a time interval when the pick roller 320 is rotating. Relative to FIG. 4, it has also been found that it is advantageous if the time interval in which optical sensor 351 is used to detect the position of top sheet 371 is before leading edge 375 of top sheet 371 reaches the turn roller 322 that is downstream of pick roller 320. This is because turn roller 322 is typically geared such that it rotates faster than pick roller 320 in order to provide tension in the media. What can happen when leading edge 375 of top sheet 371 reaches turn roller 322 is that top sheet 371, under tension from turn roller 322 located above pick roller 320, tends to lift pick roller 320 up. Measuring stack height after leading edge 375 reaches turn roller 322 can therefore give a false reading in stack height, indicating that the stack height is greater than it actually is.

In embodiments described above, the optical block 346 and its window 347 are an example of a member having a measurable property that is sensed by a sensor (in this example a varying extent to which light from a neighboring optical source is blocked from being received by a photosensor), in correlation with a position of an individual sheet of recording media 20 in a media holding receptacle, where the member or the sensor is movable along a path such that the measurable property is sensed by the sensor in order to provide a signal that is indicative of the position of the individual sheet of recording media 20 in a media holding receptacle. The member is attached to the pick arm assembly 340 and the pick roller 320 is the element that is positioned to contact the individual sheet of recording media 20. More generally, the member having a measurable property that is sensed by a sensor can have other types of measurable properties such as a variable capacitance, a variable resistance, a variable magnetic field strength, a variable spring force, and a variable optical reflectance, for example, which can be sensed by an appropriate sensor to indicate the position of an individual sheet of recording media 20.

Figure 12:
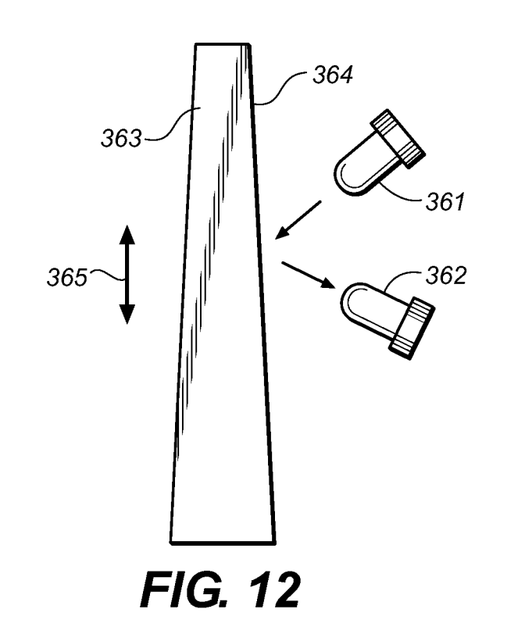
FIG. 12 is a schematic side view of an embodiment using the amount of reflected light received by an optical sensor.

FIG. 12 shows a side view of an optically reflective member 363 having a side 364 that reflects varying amounts of light from light emitter 361 to optical sensor 362 (from which light emitter 361 is spaced apart), where the varying amount of light depends upon the position of optically reflective member 363 relative to the light emitter 361 and optical sensor 362 along movement direction 365. Therefore if optically reflective member 363 is movable by pick arm assembly 340 so that side 364 is in the optical path between light emitter 361 and optical sensor 362, a signal indicative of the position of optically reflective member 363 (and the corresponding position of an individual sheet of recording media 20 in contact with pick roller 320) is provided by optical sensor 362. In the example of FIG. 12 the reason why the amount of light received by optical sensor 362 varies as optically reflective member 363 is moved along movement direction 365 is that side 364 is angled. An alternative not shown would be to have the optical reflectance of side 364 be varying along direction 365. For example, the optical reflectance of side 364 can be varied by providing a gradient in the surface finish from smooth and very reflective to rough and less reflective.

Also more generally, the media holding receptacle need not be a tray, and the media holding receptacle need not be horizontal as illustrated in FIGS. 4-6. Herein, the terms media holding receptacle and tray are sometimes used interchangeably. In other paper path configurations not shown here, the media holding receptacle can be oriented in a more vertical fashion, so that the individual sheet of recording media 20 which is contacted by the pick roller 320 is not a "top" sheet. Furthermore, the media stack 370 need not be an input source of recording media 20, but it can be a stack of documents to be scanned, for example.

Figure 13:
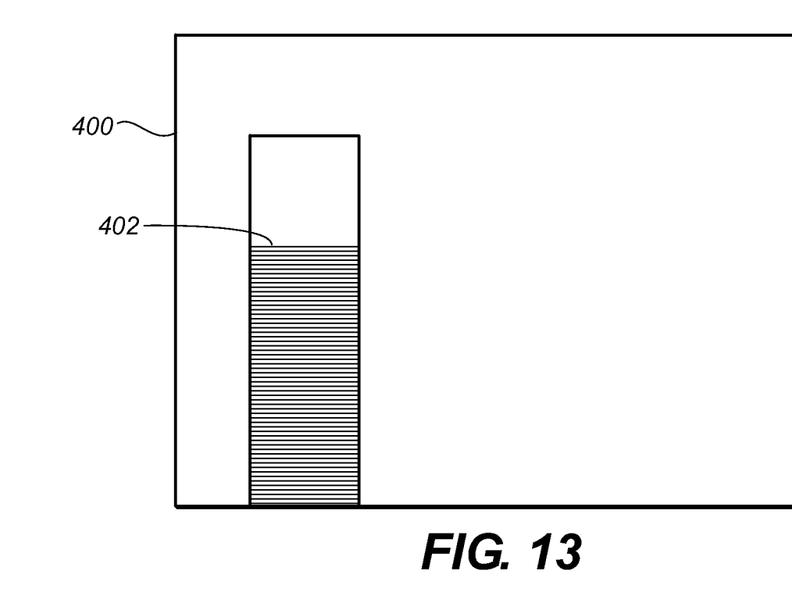
FIG. 13 is a schematic representation of a display that graphically shows the relative amount of media in a tray.

The stack height (or number of sheets) can be communicated to the user by a display or monitor which is connected wirelessly or by cable to the printing system or to an associated host computer or a mobile communications device, for example. FIG. 13 shows an example of a display 400 which graphically shows an amount of media 402 that is present in a paper tray. Optionally, in the same display, the amount of remaining ink can also be shown, so that in one glance the user can know both how much ink of different colors and how much media he has left.

Alternatively, an audible signal can be sent to a speaker in a printing system or an associated host computer to indicate position of an individual sheet of media in the media holder. For example, when the media holder is completely empty, an audible alarm will sound.

The invention has been described in detail with particular reference to certain preferred embodiments thereof, but it will be understood that variations and modifications can be effected within the spirit and scope of the invention.

PARTS LIST

10 Inkjet printer system
12 Image data source
14 Controller
15 Image processing unit
16 Electrical pulse source
18 First fluid source
19 Second fluid source
20 Recording media
100 Ink jet printhead
110 Ink jet printhead die
111 Substrate
120 First nozzle array
121 Nozzle in first nozzle array
122 Ink delivery pathway for first nozzle array
130 Second nozzle array
131 Nozzle in second nozzle array
132 Ink delivery pathway for second nozzle array
181 Droplet ejected from first nozzle array
182 Droplet ejected from second nozzle array
200 Carriage
250 Printhead chassis
251 Printhead die
253 Nozzle array
254 Nozzle array direction
256 Encapsulant 257 Flex circuit
258 Connector board
262 Multichamber ink supply
264 Single chamber ink supply
300 Printer chassis
302 Paper load entry direction
303 Print region
304 Paper exit direction
305 Direction
306 Right side of printer chassis
307 Left side of printer chassis
308 Front portion of printer chassis
309 Rear portion of printer chassis
310 Hole for paper advance motor drive gear
311 Feed roller gear
312 Feed roller
313 Forward rotation of feed roller
319 Feed roller shaft
320 Pick roller
322 Turn roller
323 Idler roller
324 Discharge roller
325 Star wheel
330 Maintenance station
340 Pick arm assembly
341 Pick arm frame
342 Drive gear
343 Axle
344 Torsion spring
345 Gear train
346 Optical block
347 Window
349 Bracket
350 Direction
351 Optical sensor
352 Sensor housing
353 Light Emitter
354 Aperture
356 Optical block
357 Window
358 Open Region
359 Direction of motion
361 Light emitter
362 Optical sensor
363 Optically reflective member
364 Side that reflects varying amounts of light
365 Movement direction
370 Stack of media
371 Top sheet
372 Main paper tray
373 Photo paper stack
374 Photo paper tray
375 Leading edge
376 Holding surface
380 Carriage motor
382 Carriage rail
384 Belt
390 Printer electronics board
392 Cable connectors
400 Display
402 Displayed amount of media in a tray
F1 First Compressive Force
F2 Second Compressive Force

The invention claimed is:

1. A method of determining an amount of media in a stack of media that is disposed within a media holding receptacle of an imaging system, the method comprising:

providing a stack-compressing element configured to contact a first piece of media in the stack of media, the first piece of media being more remote from a holding surface of the media holding receptacle than other pieces of media in the stack of media;

providing a sensor to detect a position of the first piece of media;

applying a first compressive force to the stack of media via the stack-compressing element in contact with the first piece of media;

applying a second compressive force to the stack of media via the stack-compressing element in contact with the first piece of media, the second compressive force being greater than the first compressive force; and after the second compressive force is applied to the stack of media, using the sensor to detect the position of the first piece of media.

2. The method according to claim 1, wherein the first compressive force includes a weight of the stack compressing element.

3. The method according to claim 1, wherein the first compressive force includes a spring force.

4. The method according to claim 1, the stack-compressing element including an arm and a contact element, wherein the contact element is configured to contact the first piece of paper, and wherein the second compressive force is applied to the arm.

5. The method according to claim 4, wherein applying the second compressive force includes driving a motor to pivot the arm in a direction that moves the contact element toward the holding surface of the media holding receptacle.

6. The method according to claim 5, wherein the contact element includes a roller.

7. The method according to claim 6, wherein applying the second compressive force further includes causing the roller to rotate.

8. The method according to claim 7, wherein applying the second compressive force further includes moving the first piece of media away from the media holding receptacle.

9. The method according to claim 1, wherein the sensor is an optical sensor.

10. The method according to claim 1 further comprising:
sending a plurality of signals from the sensor to a controller;
interpreting the plurality of signals as a corresponding plurality of distances between the first sheet and the holding surface of the media holding receptacle;
selecting one of the plurality of signals corresponding to a smallest distance represented by the plurality of signals; and
storing a value corresponding to the selected signal as a current stack height value.

11. The method according to claim 10 further including:
providing a thickness of a piece of media in the stack of media; and
using the provided thickness and the current stack height value to obtain a number of pieces of media currently in the stack of media.

12. A method of determining an amount of media in a stack of media that is disposed within a media input tray of a printing system, the method comprising:
providing a pick arm assembly including a pick roller that is configured to contact a first piece of media in the stack of media, the first piece of media being more remote from a holding surface of the media input tray than other pieces of media in the stack of media;
providing a sensor to detect a position of the pick roller;

applying a first compressive force to the stack of media via the pick arm assembly;

applying a second compressive force to the stack of media via the pick arm assembly, the second compressive force being greater than the first compressive force; and after applying the second compressive force to the stack of media has been initiated, using the sensor to detect the position of the first piece of media; wherein applying the second compressive force further includes driving the pick roller to rotate, and wherein using the sensor to detect the position of the first piece of media is performed during a time interval when the pick roller is rotating, and driving the pick roller causes the first piece of media in the stack of media to move toward a downstream roller, and wherein the time interval during which the sensor is used to detect the position of the first piece of media is prior to a time when a leading edge of the first piece of media reaches the downstream roller.

13. The method according to claim 12, wherein the first compressive force includes a weight of the pick arm assembly.

14. The method according to claim 12, wherein the first compressive force includes a spring force.

15. The method according to claim 12 further including:

sending a plurality of signals from the sensor to a controller;

interpreting the plurality of signals as a corresponding plurality of distances between the first sheet and the holding surface of the media input tray;

selecting one of the plurality of signals corresponding to a smallest distance represented by the plurality of signals; and storing a value corresponding to the selected signal as a current stack height value.

16. The method according to claim 15 further including:

providing a thickness of a piece of media in the stack of media; and using the provided thickness and the current stack height value to obtain a number of pieces of media currently in the stack of media.

17. The method according to claim 12, wherein the sensor is an optical sensor.

18. The method according to claim 12, wherein at least one of the pieces of media in the stack of media has previously been printed on.

* * * * *